US009071998B2

(12) United States Patent
Kakadia et al.

(10) Patent No.: US 9,071,998 B2
(45) Date of Patent: Jun. 30, 2015

(54) OPTIMIZING PERFORMANCE INFORMATION COLLECTION

(71) Applicant: Verizon Patent and Licensing Inc., Basking Ridge, NJ (US)

(72) Inventors: Deepak Kakadia, St. Antioch, CA (US); Javier M. Lopez, Alameda, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 14/147,813

(22) Filed: Jan. 6, 2014

(65) Prior Publication Data

US 2014/0119226 A1    May 1, 2014

Related U.S. Application Data

(62) Division of application No. 13/288,173, filed on Nov. 3, 2011, now Pat. No. 8,627,468.

(51) Int. Cl.
| G06F 11/00 | (2006.01) |
| H04W 24/08 | (2009.01) |
| H04W 24/00 | (2009.01) |
| H04W 24/04 | (2009.01) |
| H04W 92/04 | (2009.01) |

(52) U.S. Cl.
CPC .............. *H04W 24/08* (2013.01); *H04W 24/00* (2013.01); *H04W 24/04* (2013.01); *H04W 92/045* (2013.01)

(58) Field of Classification Search
CPC ..... H04W 24/08; H04W 24/00; H04W 24/04; H04W 92/045; G06F 8/61; G06F 9/443; G06F 9/4887; G06F 11/3409; G06F 11/3495; G06F 15/163; G06F 21/41; G06F 21/554; G06F 2201/86; G06F 2201/875; G06F 2221/2111; G06F 3/048; G06F 9/4881; G06F 9/50; G06F 9/5061; G06F 9/5077; H04L 41/0896; H04L 43/0829; H04L 43/0847; H04L 43/0852; H04L 43/087; H04L 43/16; H04L 63/145; H04L 67/1095; H04L 67/2819; H04L 67/2842; H04L 69/329; H04L 47/70; H04L 29/08198; H04L 41/042; H04L 41/044; H04L 41/046; H04L 41/0833; H04L 43/00; H04L 43/04; H04L 63/10; H04L 63/1408; H04L 63/20; H04L 67/02; H04L 67/1014; H04L 67/1097
USPC ............... 726/22–26; 709/223–226; 713/188, 713/194; 370/230, 230.1, 231, 235, 236.2, 370/241, 248, 252
See application file for complete search history.

(56) References Cited

U.S. PATENT DOCUMENTS

| 8,102,770 | B2 * | 1/2012 | Morrill et al. .................. 370/235 |
| 8,310,923 | B1 * | 11/2012 | Nordstrom et al. ............ 370/230 |
| 8,400,919 | B1 * | 3/2013 | Amdahl et al. ............. 370/230.1 |

*Primary Examiner* — Thanhnga B Truong

(57) ABSTRACT

A network management system may detect a network condition corresponding to a network and evaluate the network condition to identify types of network performance information corresponding to the network condition. The network management system may prioritize the types of network performance information and communicate priority information to a network device. The priority information may include the types of network performance information identified by the network management system and/or the priority associated with each type of network performance information. The network device may receive the priority information, evaluate the availability of device resources, collect network performance information based on the priority information and the availability of device resources, and communicate the network performance information to the network management system.

20 Claims, 8 Drawing Sheets

OPTIMIZING PERFORMANCE INFORMATION COLLECTION

CROSS-REFERENCE TO RELATED APPLICATION

This application is a divisional of U.S. patent application Ser. No. 13/288,173, filed Nov. 3, 2011, the disclosure of which is hereby incorporated herein in its entirety.

BACKGROUND

Currently available network technologies include approaches to collecting network performance information. However, such approaches often include one or more of a variety of deficiencies. For example, current approaches to collecting network performance information often increase the level of congestion in a network by collecting insignificant or otherwise unnecessary network performance information.

DETAILED DESCRIPTION OF PREFERRED EMBODIMENTS

The following detailed description refers to the accompanying drawings. The same labels and/or reference numbers in different drawings may identify the same or similar elements.

In one or more implementations, described herein, devices may be used to optimize the collection of network performance information.

Figure 1:
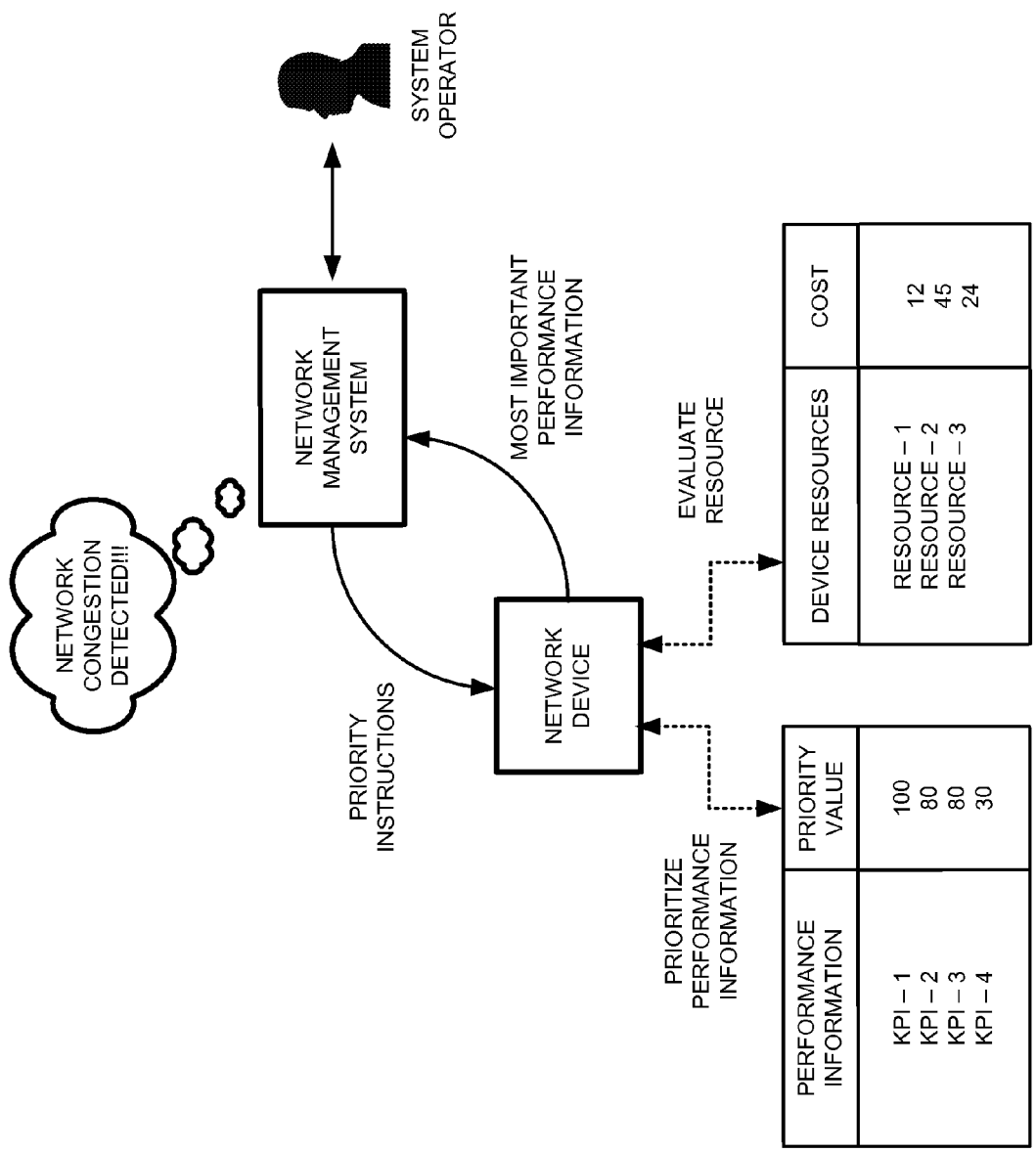
FIG. 1 is a diagram of an example overview of an implementation described herein.

FIG. 1 is a diagram of an example overview of an implementation described herein. As depicted in FIG. 1, a user or system operator may configure a network management system to monitor network congestion, network strain, or other types of parameters associated with network performance characteristics corresponding to a network (e.g., a radio access network (RAN)) and/or a network device (e.g., a base station). In response to detecting a problem in the network, the network management system may identify performance information (also referred to herein as "key performance indicators" or KPIs) relating to the detected problem and communicate priority instructions to the network device.

The network device may receive the priority instructions and use the priority instructions to prioritize network performance information that is typically (or that can be) collected by the network device. For example, as depicted in the example of FIG. 1, the network device may create a list of network performance information and assign a priority value to each type of network performance information. The network device may also, or alternatively, evaluate local resources (e.g., processing capacity, memory capacity, bandwidth capacity, etc.) and/or other conditions relating to the network device, in order to determine how resource intensive (or costly) it would be to calculate, collect, or otherwise obtain the different types of network performance information. In response to prioritizing network performance information and/or evaluating the availability of local resources, the network device may collect performance information based on the prioritized performance information and the evaluated resources, which may include a comparison or another type of analysis of the prioritized network performance information and the cost associated with collecting the performance information.

The network device may communicate the collected information to the network management system so that the network management system may continue analyzing network performance and/or investigating problems or other types of issues related to the network or a network device. The network management system may also, or alternatively, provide system diagnostic information to the system operator so that the system operator may better understand current operating conditions in the network and/or initiate investigations or take corrective measures with respect to the network. In some implementations, the network management system may also, or alternatively, be capable of initiating investigations or taking corrective action based on network performance information received from the network device.

As such, one or more implementations, discussed herein, may provide a solution to collecting network performance information without unnecessarily creating network congestions or causing one or more other types of network performance problems. Additionally, or alternatively, one or more of the implementations discussed herein may provide solutions to evaluating the importance of different types of performance information and providing the most important performance information to a network management system so that vital, problematic, or otherwise significant aspects of a network or network device may be analyzed and/or investigated. Further, one or more implementations, discussed herein, may provide solutions to taking into account the capacity of a particular network device to collect performance information so that collecting the performance information does not interrupt other (and possibly more important) network functions or operations performed by the network device. Accordingly, one or more of the implementations described herein may provide intelligent, dynamic solutions to identifying, investigating, and analyzing network performance problems or other types of issues relating to a network or a network device.

Figure 2:
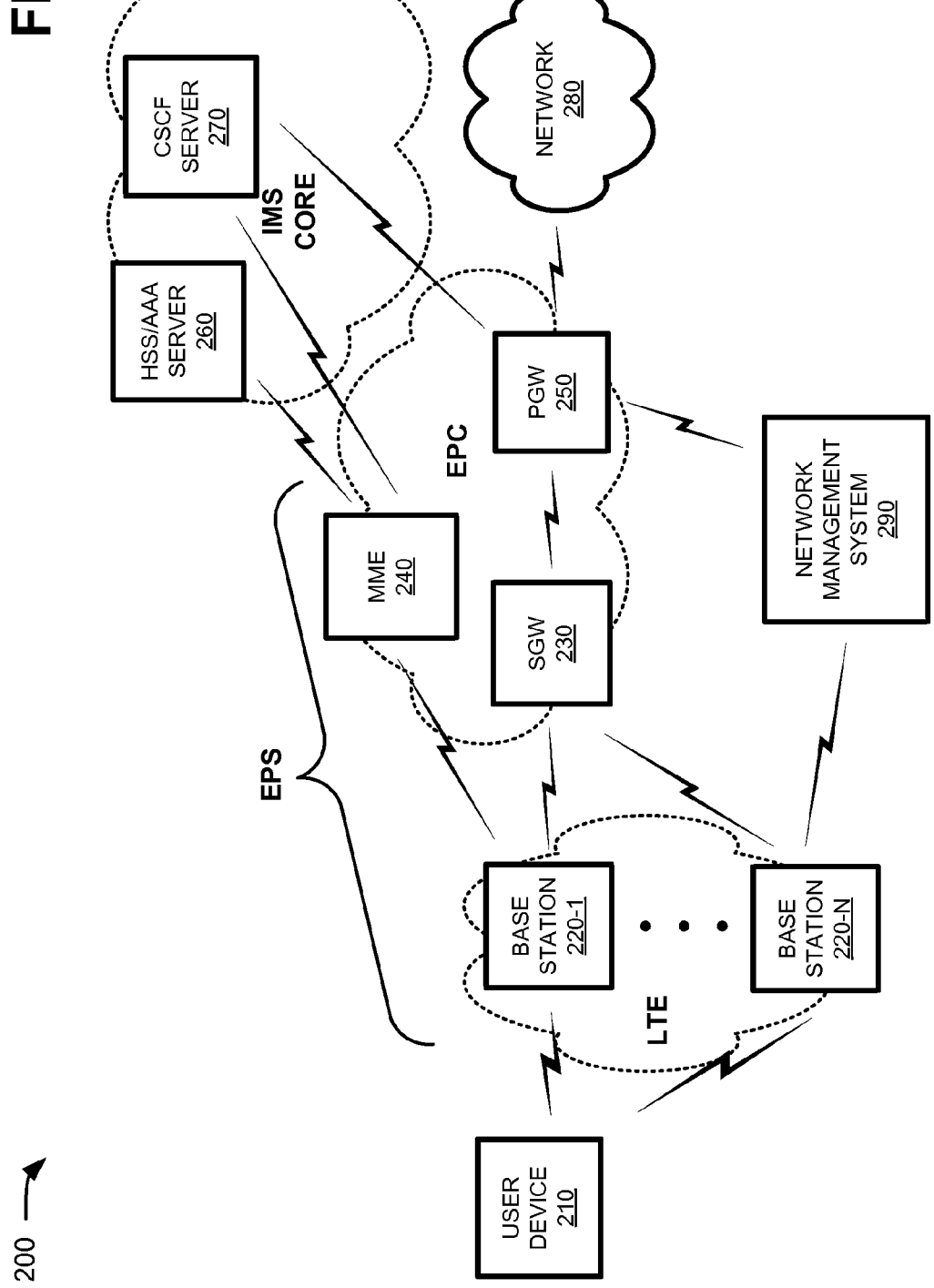
FIG. 2 is a diagram of an example environment in which systems and/or methods, described herein, may be implemented.

FIG. 2 is a diagram of an example environment 200 in which systems and/or methods described herein may be implemented. As shown in FIG. 2, environment 200 may include a user device 210, a group of base stations 220-1, ..., 220-N (where N≥1) (hereinafter referred to collectively as "base stations 220," and individually as "base station 220"), a serving gateway 230 (hereinafter referred to as "SGW 230"), a mobility management entity device 240 (hereinafter referred to as "MME 240"), a packet data network (PDN) gateway (PGW) 250, a home subscriber server (HSS)/authentication, authorization, accounting (AAA) server 260 (hereinafter referred to as an "HSS/AAA server 260"), a call session control function (CSCF) server 270 (hereinafter referred to as "CSCF server 270"), a network 280, and a network management system 290.

User device 210, base station 220, SGW 230, MME 240, PGW 250, HSS/AAA server 260, and CSCF server 270 are each examples of the network device discussed above with reference to FIG. 1. However, the number of devices and/or networks, illustrated in FIG. 2, is provided for explanatory purposes only. In practice, there may be additional devices and/or networks, fewer devices and/or networks, different devices and/or networks, or differently arranged devices and/or networks than illustrated in FIG. 2.

Also, in some implementations, one or more of the devices of environment 200 may perform one or more functions described as being performed by another one or more of the devices of environment 200. Devices of environment 200 may interconnect via wired connections, wireless connections, or a combination of wired and wireless connections.

Implementations are described as being performed within a RAN that is based on a long term evolution (LTE) network for explanatory purposes. In other implementations, the implementations may be performed within a RAN that is not based on a LTE network.

Environment 200 may include an evolved packet system (EPS) that includes a LTE network and/or an evolved packet core (EPC) that operate based on a third generation partnership project (3GPP) wireless communication standard. The LTE network may be a RAN that includes one or more base stations 220 that take the form of evolved Node Bs (eNBs) via which user device 210 communicates with the EPC. The EPC may include SGW 230, MME 240, and/or PGW 250 that enable user device 210 to communicate with network 280 and/or an Internet protocol (IP) multimedia subsystem (IMS) core. The IMS core may include HSS/AAA server 260 and/or CSCF server 270 and may manage authentication, session initiation, account information, profile information, etc. associated with user devices 210.

User device 210 may include any computation or communication device, such as a wireless mobile communication device that is capable of communicating with base station 220 and/or a network (e.g., network 280). For example, user device 210 may include a radiotelephone, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), a smart phone, a laptop computer, a tablet computer, a camera, a personal gaming system, or another type of mobile computation or communication device. User device 210 may send traffic to and/or receive traffic from network 280.

Base station 220 may include one or more devices that receive, process, and/or transmit traffic, such as audio, video, text, and/or other data, destined for and/or received from user device 210. In an example implementation, base station 220 may be an eNB associated with the LTE network that receives traffic from and/or sends traffic to network 280 via SGW 230 and PGW 250. Base station 220 may send traffic to and/or receive traffic from user device 210 via an air interface. In another example, one or more other base stations 220 may be associated with a radio access network (RAN) that is not associated with the LTE network.

SGW 230 may include one or more computation or communication devices that gather, process, search, store, and/or provide information in a manner described herein. SGW 230 may include one or more data processing and/or traffic transfer devices, such as a gateway, a router, a modem, a switch, a firewall, a network interface card (NIC), a hub, a bridge, a proxy server, an optical add-drop multiplexer (OADM), or some other type of device that processes and/or transfers traffic. In one example implementation, SGW 230 may aggregate traffic received from one or more base stations 220 associated with the LTE network, and may send the aggregated traffic to network 280 (e.g., via PGW 250) and/or other network devices associated with the IMS core and/or the EPC. SGW 230 may also receive traffic from the other network devices and/or may send the received traffic to user device 210 via base station 220. SGW 230 may perform operations associated with handing off user device 210 from and/or to the LTE network.

MME 240 may include one or more computation or communication devices that gather, process, search, store, and/or provide information in a manner described herein. For example, MME 240 may perform operations associated with handing off user device 210, from a first base station 220 to a second base station 220, when user device 210 is exiting a cell associated with the first base station 220. MME 240 may, in yet another example, perform an operation to handoff user device 210 from the second base station 220 to the first base station 220 when user device 210 is entering the cell associated with first base station 220.

PGW 250 may include one or more computation or communication devices that gather, process, search, store, and/or provide information in a manner described herein. PGW 250 may include one or more data processing and/or traffic transfer devices, such as a gateway, a router, a modem, a switch, a firewall, a NIC, a hub, a bridge, a proxy server, an OADM, or some other type of device that processes and/or transfers traffic. In one example implementation, PGW 250 may include a device that aggregates traffic received from one or more SGWs 230, etc. and may send the aggregated traffic to network 280. In another example implementation, PGW 250 may receive traffic from network 280 and may send the traffic toward user device 210 via SGW 230.

HSS/AAA server 260 may include one or more server devices, or other types of computation or communication devices, that gather, process, search, store, and/or provide information in a manner described herein. For example, HSS/AAA server 260 may manage, update, and/or store, in a memory associated with HSS/AAA server 260, profile information associated with user device 210 that identifies applications and/or services that are permitted for and/or accessible by user device 210, information associated with a user of user device 210 (e.g., a username, a password, a personal identification number (PIN), etc.), rate information, minutes allowed, and/or other information. Additionally, or alternatively, HSS/AAA server 260 may include a device that performs authentication, authorization, and/or accounting (AAA) operations associated with a communication session with user device 210.

CSCF server 270 may include one or more server devices, or other types of computation or communication devices, that gather, process, search, store, and/or provide information in a manner described herein. CSCF server 270 may process and/or route calls to and from user device 210 via the EPC. For example, CSCF server 270 may process calls, received from network 280, that are destined for user device 210. In another example, CSCF server 270 may process calls, received from user device 210, that are destined for network 280.

Network 280 may include one or more wired and/or wireless networks. For example, network 280 may include a cellular network, a public land mobile network (PLMN), a second generation (2G) network, a 3G network, a 4G network, a fifth generation (5G) network, and/or another network. Additionally, or alternatively, network 280 may include a wide area network (WAN), a metropolitan area network (MAN), a telephone network (e.g., the Public Switched Telephone Network (PSTN)), an ad hoc network, an intranet, the Internet, a fiber optic-based network (e.g., FiOS), a backhaul and/or management network, and/or a combination of these or other types of networks.

Network management system 290 may include one or more types of computing or communication devices. For example, network management system 290 may include a desktop computer, a server, a cluster of servers, or one or more other types of computing or communication devices. Network management system 290 may be capable of operating in accordance with one or more of the systems, environments, devices, functions, processes, and/or operations described herein. For example, network management system 290 may be capable of detecting congestions or one or more other types of network-related performance measures in environment 200, communicating priority instructions to a network device (e.g., user device 210, base station 220, SGW 230, MME 240, PGW 250, HSS/AAA server 260, and/or CSCF server 270), and collecting network performance information from the network device. Network management system 290 may also, or alternatively, be capable of taking corrective action based on the network performance information received from the network device and/or providing the network performance information to a system operator via a client device, such as a desktop computer (not shown in FIG. 2).

While implementations herein are described primarily in the context of broadband services via LTE, other wireless standards may be used. For example, components conforming to LTE standards described herein may be replaced by components conforming to other network standards (e.g., GSM, WCDMA, UMB, UMTS, CDMA2000, HSPA, 802.11, or other network standards).

Figure 3:
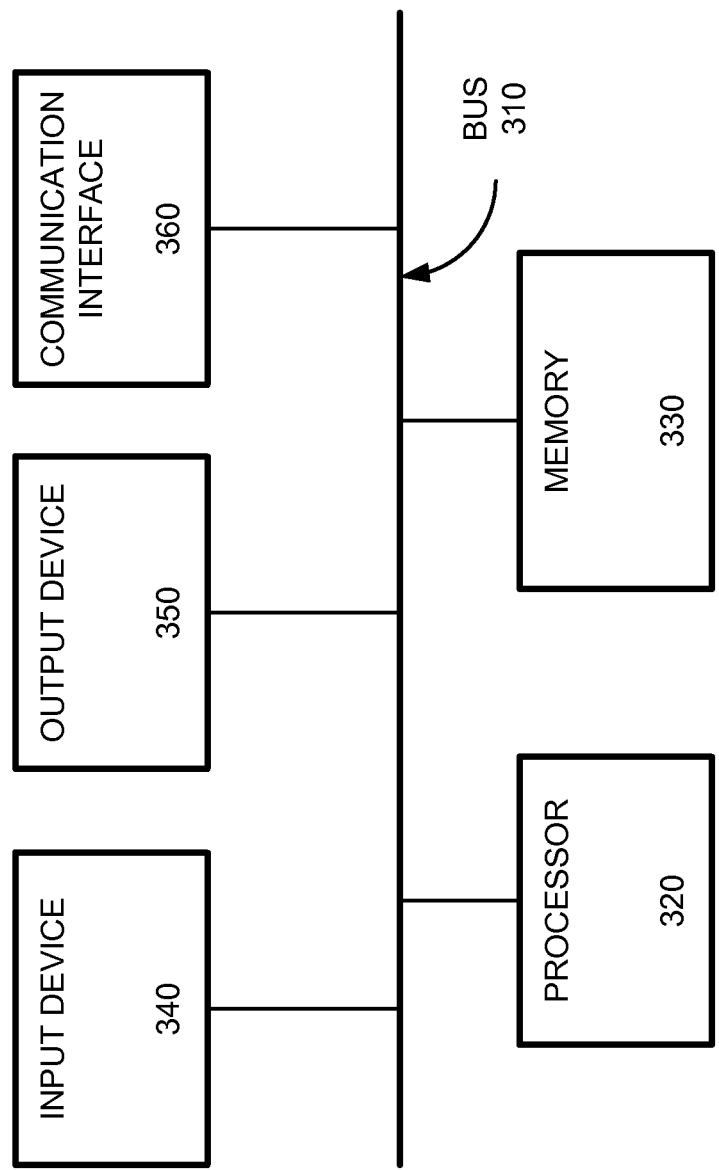
FIG. 3 is a diagram of an example of a device of FIG. 2.

FIG. 3 is a diagram of example components of device 300 that may be used within environment of FIG. 2. For example, device 300 may correspond to user device 210, SGW 230, MME 240, PGW 250, HSS/AAA server 260, CSCF server 270, and/or network management system 290. Each of user device 210, SGW 230, MME 240, PGW 250, HSS/AAA server 260, CSCF server 270, and/or network management system 290 may include one or more devices 300 and/or one or more of the components of device 300.

As depicted, device 300 may include bus 310, processor 320, memory 330, input device 340, output device 350, and communication interface 360. However, the precise components of device 300 may vary between implementations. For example, depending on the implementation, device 300 may include fewer components, additional components, different components, or differently arranged components than those illustrated in FIG. 3.

Bus 310 may permit communication among the components of device 300. Processor 320 may include one or more processors, microprocessors, data processors, co-processors, network processors, application-specific integrated circuits (ASICs), controllers, programmable logic devices (PLDs), chipsets, field-programmable gate arrays (FPGAs), or other components that may interpret or execute instructions or data. Processor 320 may control the overall operation, or a portion thereof, of device 300, based on, for example, an operating system (not illustrated) and/or various applications. Processor 320 may access instructions from memory 330, from other components of device 300, or from a source external to device 300 (e.g., a network or another device).

Memory 330 may include memory and/or secondary storage. For example, memory 330 may include random access memory (RAM), dynamic RAM (DRAM), read-only memory (ROM), programmable ROM (PROM), flash memory, or some other type of memory. Memory 330 may include a hard disk (e.g., a magnetic disk, an optical disk, a magneto-optic disk, a solid state disk, etc.) or some other type of computer-readable medium, along with a corresponding drive. A computer-readable medium may be defined as a non-transitory memory device. A memory device may include space within a single physical memory device or spread across multiple physical memory devices.

Input device 340 may include one or more components that permit a user to input information into device 300. For example, input device 340 may include a keypad, a button, a switch, a knob, fingerprint recognition logic, retinal scan logic, a web cam, voice recognition logic, a touchpad, an input port, a microphone, a display, or some other type of input component. Output device 350 may include one or more components that permit device 300 to output information to a user. For example, output device 350 may include a display, light-emitting diodes (LEDs), an output port, a speaker, or some other type of output component.

Communication interface 360 may include one or more components that permit device 300 to communicate with other devices or networks. For example, communication interface 360 may include some type of wireless or wired interface. Communication interface 330 may also include an antenna (or a set of antennas) that permit wireless communication, such as the transmission and reception of radio frequency (RF) signals.

As described herein, device 300 may perform certain operations in response to processor 320 executing software instructions contained in a computer-readable medium, such as memory 330. The software instructions may be read into memory 330 from another computer-readable medium or from another device via communication interface 360. The software instructions contained in memory 330 may cause processor 320 to perform one or more processes described herein. Alternatively, hardwired circuitry may be used in place of, or in combination with, software instructions to implement processes described herein. Thus, implementations described herein are not limited to any specific combination of hardware circuitry and software.

Figure 4:
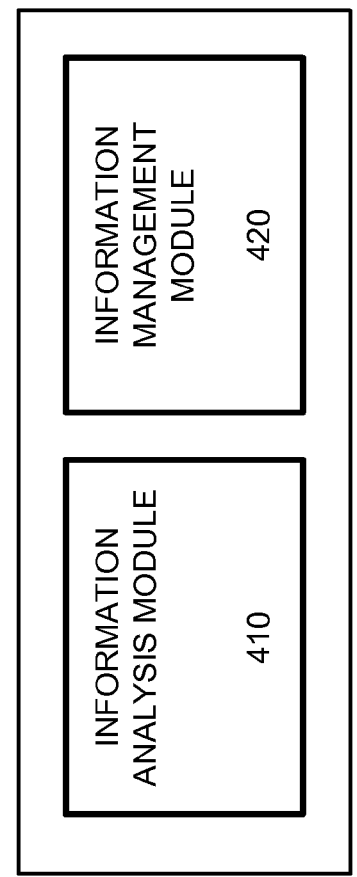
FIG. 4 is a diagram of example functional components of a device according to one or more implementations described herein.

FIG. 4 is a diagram of example functional components of network management system 290 according to one or more implementations described herein. As depicted, network management system 290 may include information analysis module 410 and information management module 420. Depending on the implementation, one or more of modules 410-420 may be implemented as a combination of hardware and software based on the components illustrated and described with respect to FIG. 3. Alternatively, modules 410-420 may each be implemented as hardware based on the components illustrated and described with respect to FIG. 3.

Information analysis module 410 may provide functionality with respect to analyzing information. For example, information analysis module 410 may enable network management system 290 to analyze network performance information (e.g., KPIs) and/or one or more other types of information. Examples of network performance information may include a quantity of create session requests, a quantity of delete bearer session requests, a quantity of modify bearer quality of service requests, a quantity of octets in an interface, processor usage statistics, a quantity of dropped calls, a packet loss ratio, a throughput ratio, a latency measurement, and/or one or more other types of information relating to the performance of a network or a network device.

In some implementations, information analysis module 410 may enable network management system 290 to analyze network performance information to identify or detect network strain, network congestion, security breaches, malicious activity (e.g., viruses, malware, spyware, adware, etc.), potentially malicious activity, suspicious activity, or one or more other types of conditions, scenarios, actions, and/or behaviors corresponding to a network or a network device. Information analysis module 410 may also, or alternatively, enable network management system 290 to identify one or more network devices corresponding to one or more network conditions.

Additionally, or alternatively, information analysis module 410 may enable network management system 290 to identify or otherwise determine types of network performance information corresponding to a particular network scenario, network condition, network action, and/or network behavior. Examples of network performance information types may include packet loss information corresponding to a particular network, throughput information corresponding to a particular network, latency information corresponding to a particular network, and/or one or more other types of information relating to the performance of a network or a network device.

Information management module 420 may provide functionality with respect to managing information. For example, information management module 420 may enable network management system 290 to prioritize one or more types of network performance information. For instance, information management module 420 may cooperate with information analysis module 410 identify network performance information corresponding to suspicious network activity and prioritize types of network performance information (e.g., KPIs) based on the identified network performance information identified. Information management module 420 may also, or alternatively, enable network management system 290 to communicate priority information (e.g., prioritized types of network performance information) to one or more network devices (e.g., user device 210, base station 220, SGW 230, MME 240, PGW 250, HSS/AAA server 260, CSCF server 270, etc.). Additionally, or alternatively, information management module 420 may enable network management system 290 to receive network performance information, from a network device, in accordance with priority information communicated to the network device.

In addition to the functionality described above, the functional components of network management server 290 may also, or alternatively, provide functionality as described elsewhere in this description. For example, in some implementations, information analysis module 410 may identify when an information collection function, corresponding to a particular network device, becomes unnecessary, and information management module 420 may communicate a request to the network device to terminate the information collection function in order to, for example, help the network device conserve device resources. By contrast, information management module 420 may also, or alternatively, communicate a request to the network device to start performing a particular information collection function in order to, for example, begin collecting high-priority network performance information. Further, while FIG. 4 shows a particular number and arrangement of modules, in alternative implementations, network management system 290 may include additional modules, fewer modules, different modules, or differently arranged modules than those depicted.

Figure 5:
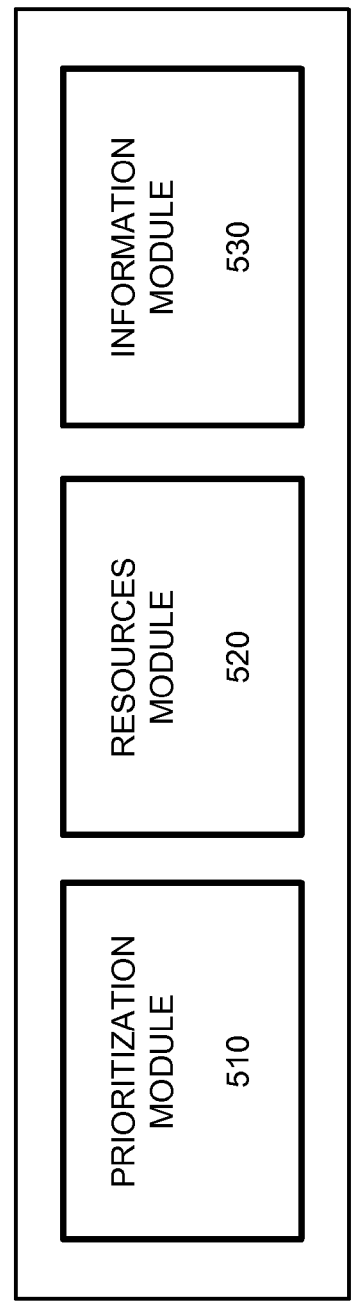
FIG. 5 is a diagram of example functional components of a network management system according to one or more implementations described herein.

FIG. 5 is a diagram of example functional components of a network device 500 according to one or more implementations described herein. Device 500 may correspond to base station 220, but device 500 may also, or alternatively, correspond to SGW 230, MME 240, PGW 250, HSS/AAA server 260, and/or CSCF server 270. However, network device 500 may also, or alternatively, include any type, variety, and/or combination of computing and/or communication device capable of operating within a network environment.

As depicted, network device 500 may include prioritization module 510, resources module 520, and information module 530. Depending on the implementation, one or more of modules 510-530 may be implemented as a combination of hardware and software based on the components illustrated and described with respect to FIG. 3. Alternatively, modules 510-530 may each be implemented as hardware based on the components illustrated and described with respect to FIG. 3.

Prioritization module 510 may provide functionality with respect to prioritizing information. For example, prioritization module 510 may enable network device 500 to prioritize one or more types of network performance information. In some implementations, prioritization module 510 may enable network device 500 to prioritize the types of network performance information based on priority information received from network management system 290. Additionally, or alternatively, prioritization module 510 may enable network device 500 to prioritize the types of network performance information based on one or more other types of criteria, such as a duration of time that has transpired from the last time a particular type of network performance information was sent to network management system 290. As mentioned above, prioritization module 510 may enable network device 500 to prioritize the types of network performance information by creating a list, an array, or another type of arrangement of network performance information types and associating a priority value with each of the network performance information types.

Resources module 520 may provide functionality with respect to device resources. For instance, resources module 520 may enable network device 500 to evaluate the availability or usage of one or more local resources (e.g., processing capacity, memory capacity, bandwidth capacity, etc.). As mentioned above, resources module 520 may enable network device 500 to evaluate device resources by creating a list, an array, or another type of arrangement of device resources and by associating a cost to each of the device resources.

The cost associated with each device resource may represent a burden that would be placed on network device 500 to use the device resource to, for example, collect, calculate, and/or communicate one or more types of network performance information to network management system 290. For example, if a processor of network device 500 is being used extensively, the cost associated with using the processor to collect or calculate network performance information may be relatively high; however, if the processor is not being used in a significant manner, the cost associated with using the processor to collect and/or calculate network performance information may be relatively low.

In some implementations, resources module 520 may also, or alternatively, enable network device 500 to evaluate one or more device resources that are not local to network device 500 (e.g., the processing capacity of another device, the memory capacity of another device, the bandwidth capacity of another device etc.). In some implementations, when one network device 500 is located in between another network device 500 and network management system 290, being able to evaluate the device resources corresponding to the "in between" network device 500 may enable the other network device 500 to evaluate whether the "in between" network device 500 is capable of relaying network performance information to network management system 290.

Information module 530 may provide functionality with respect to network performance information. For example, information module 530 may enable network device 500 to determine which types of network performance information to collect or calculate. In some implementations, information module 530 may enable network device 500 to determine which types of network performance information to collect or calculate based on, for example, the prioritized list of network performance information types created by prioritization module 510 and/or the list of device resources created by resources module 520.

In addition to the functionality described above, the functional components of network device 500 may also, or alternatively, provide functionality as described elsewhere in this description. Further, while FIG. 5 shows a particular number and arrangement of modules, in alternative implementations, network device 500 may include additional modules, fewer modules, different modules, or differently arranged modules than those depicted.

Figure 6:
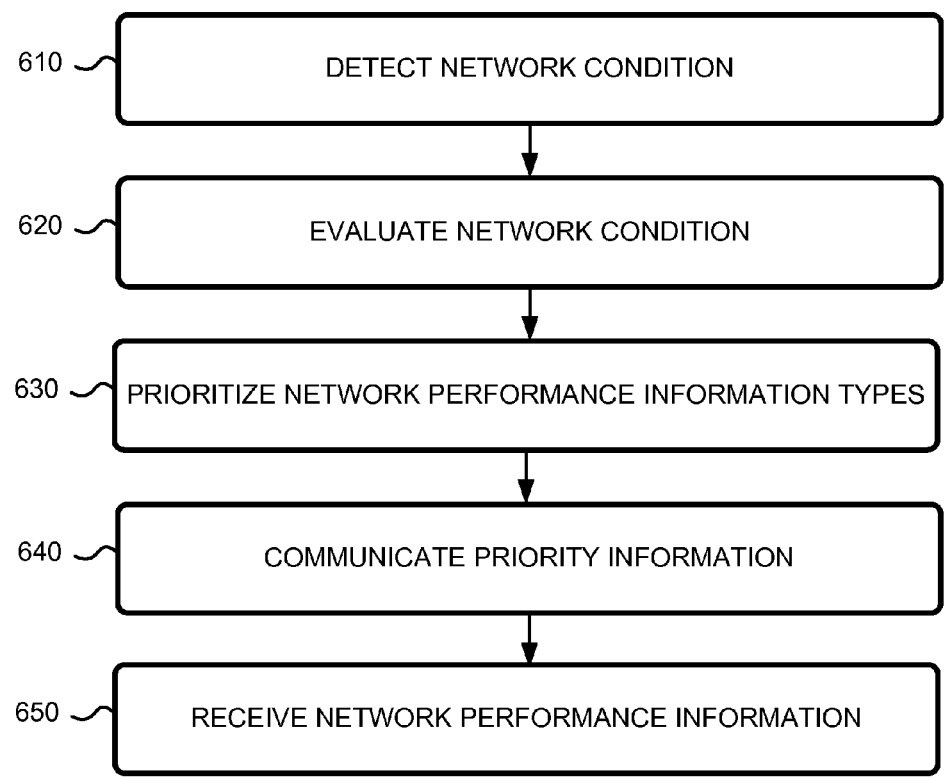
FIG. 6 is a diagram of an example process for responding to a network condition according to one or more implementations described herein.

FIG. 6 is a diagram of an example process 600 for responding to a network condition according to one or more implementations described herein. In one or more implementations, process 600 may be performed by one or more components of network management system 290. In other implementations, some or all of process 600 may be performed by one or more other components/devices, or a group of components/devices, including or excluding network management system 290.

A network condition may be detected (block 610). For example, network management system 290 may detect one or more network conditions. As mentioned above, a network condition, as used herein, may correspond to one or more of a variety scenarios, such as a particular level or threshold of network strain, a particular level or threshold of network congestion, a quantity, severity, and/or frequency of security breaches, a quantity, severity, and/or frequency malicious activity (e.g., viruses, malware, spyware, adware, etc.), a quantity, severity, and/or frequency of potentially malicious activity, a quantity, severity, and/or frequency of suspicious activity, or one or more other types of conditions, scenarios, actions, and/or behaviors corresponding to a network, a network device, or a network function or process. In some implementations, detecting a network condition may also, or alternatively, include receiving a particular input from a system operator via a client device or another type of device.

Detecting a network condition may include a quantity of network strain exceeding a network strain quantity threshold, a level of network congestion exceeding a network congestion level threshold, a quantity of network security breaches exceeding a network security breach quantity threshold, and/or a severity level, corresponding to a network security breach, exceeding a network security breach severity level threshold. Detecting a network condition may also, or alternatively, include Detecting a network condition may include a frequency of network security breaches exceeding a network security breach frequency threshold, a quantity of malicious network activity instances exceeding a malicious network activity quantity threshold, or a severity level, corresponding to malicious network activity, exceeding a malicious network activity severity level threshold. Additionally, or alternatively, detecting a network condition may include a frequency of malicious network activity exceeding a malicious network activity frequency threshold, a quantity of suspicious network activity instances exceeding a suspicious network activity quantity threshold, a severity level, corresponding to suspicious network activity, exceeding a suspicious network activity severity threshold, or the network condition corresponds to a frequency of suspicious network activity exceeding a suspicious network activity threshold.

The network condition may be evaluated (block 620). For instance, network management system 290 may evaluate a previously detected network condition. In some implementations, network management system 290 may evaluate the network condition by evaluating one or more types of network performance information and/or one or more other types of information. The network performance information and/or the one or more other types of information may include information relating or otherwise corresponding to the detected network condition. In some implementations, the network performance information and/or one or more other types of information may be information previously received from one or more network devices (e.g., user device 210, base station 220, SGW 230, MME 240, PGW 250, HSS/AAA server 260, CSCF server 270, etc.), while in other implementations, the network performance information and/or one or more other types of information may also, or alternatively, be information produced or otherwise procured by network management system 290.

In some implementations, network management system 290 may evaluate the network performance information to identify, characterize, or otherwise analyze the network condition. For instance, if the network condition detected by network management system 290 were a relatively high level of network congestion, network management system 290 may identify packet loss, throughput, and latency, as types of network performance information that are relevant to the network condition. In some implementations, network management system 290 may also, or alternatively, determine, ascertain, or produce other types of information relating to the network conditions, such as one or more device identifiers of network devices relating to the network condition, a time when the network conditions was detected, a level of severity corresponding to the network condition, and/or one or more other types of information relating to the network condition.

Network performance information types may be prioritized (block 630). For example, network management system 290 may prioritize one or more types of network performance information. In some implementations, network management system 290 may prioritize the types of network performance information based on the network condition and/or the evaluation of the network condition. For instance, network management system 290 may prioritize types of network performance information based on a level of relevancy that each type of network performance information has to the network condition. For example, if the network condition corresponded to a high level of congestion, network management system 290 might place a relatively high priority on packet loss information, throughput information, and/or latency information.

Additionally, or alternatively, network management system 290 may prioritize types of network performance information based on an amount of network performance information that network management system 290 currently has and/or an amount of new network performance information that network management system 290 would expect to receive in the near future. For example, if the network condition corresponded to a high level of congestion, if network management system 290 had just received a significant amount of packet loss information, throughput information, and latency information, and if new packet loss information, throughput information, and latency information would likely be redundant (over the near future), then network management system 290 might assign a lower priority to packet loss information, throughput information, and/or latency information.

In some implementations, network management system 290 may prioritize types of network performance information based on one or more additional, or alternative, factors. For instance, in some implementations, network management system 290 may prioritize types of network performance information based on other network conditions that have been detected, network performance information that network management system 290 is already expecting to receive in the near future, or one or more other types of factors. For example, if a recently detected network condition were considered to be a more significant problem than a newly detected network condition, network management system 290 may downgrade the priority that might have otherwise been assigned to a type of network performance information relating to the newly detected network condition.

In another example, if a recently detected network condition resulted in network management system 290 assigning a relatively high priority to a particular type of network performance information, and if a newly detected network condition was also related to that particular type of network performance information, network management system 290 might downgrade the priority that might have otherwise been assigned to the type of network performance information relating to the newly detected network condition since network management system 290 would already be expecting to receive the particular type of network performance information. As such, network management system 290 may be capable of prioritizing types of network performance information in one or more of a variety of ways and/or based on one or more of a variety of factors.

Priority information may be communicated (block 640). For example, network management system 290 may send, transmit, or otherwise communicate priority information. In some implementations, network management system 290 may communicate the priority information to one or more network devices corresponding to one or more network conditions. As mentioned above, the priority information may include instructions and/or other types of information regarding the priority of one or more types of network performance information. In other words, the priority information may provide instructions and/or information on how a particular network device 500 should prioritize one or more types of network performance information.

Network performance information may be received (block 650). For example, network management system 290 may receive one or more types of network performance information. In some implementations, network management system 290 may receive the network performance information from one or more network devices 500 (e.g., user device 210, base station 220, SGW 230, MME 240, PGW 250, HSS/AAA server 260, CSCF server 270, etc.). In some implementations, the network performance information received by network management system 290 may be consistent with the priority information communicated by network management system 290.

While FIG. 6 shows a flowchart diagram of an example process 600 for responding to a network condition, in other implementations, a process for providing priority instructions may include fewer operations, different operations, differently arranged operations, or additional operations than depicted in FIG. 6.

For instance, in one example, a process for responding to a network condition may include notifying a user or system operator of a detected network condition, providing the user with network performance information corresponding to the network condition, receiving one or more instructions from the user, and/or implementing or otherwise executing the instructions received from the user. In some implementations, involving the user may enable network management system 290 to receive instructions from the user to solve, mitigate, or otherwise address the network condition detected by network management system 290. In other implementations, network management system 290 may be capable of automatically reacting or responding to the network condition based on the type of network condition detected and/or the network performance information received from network devices 500.

Figure 7:
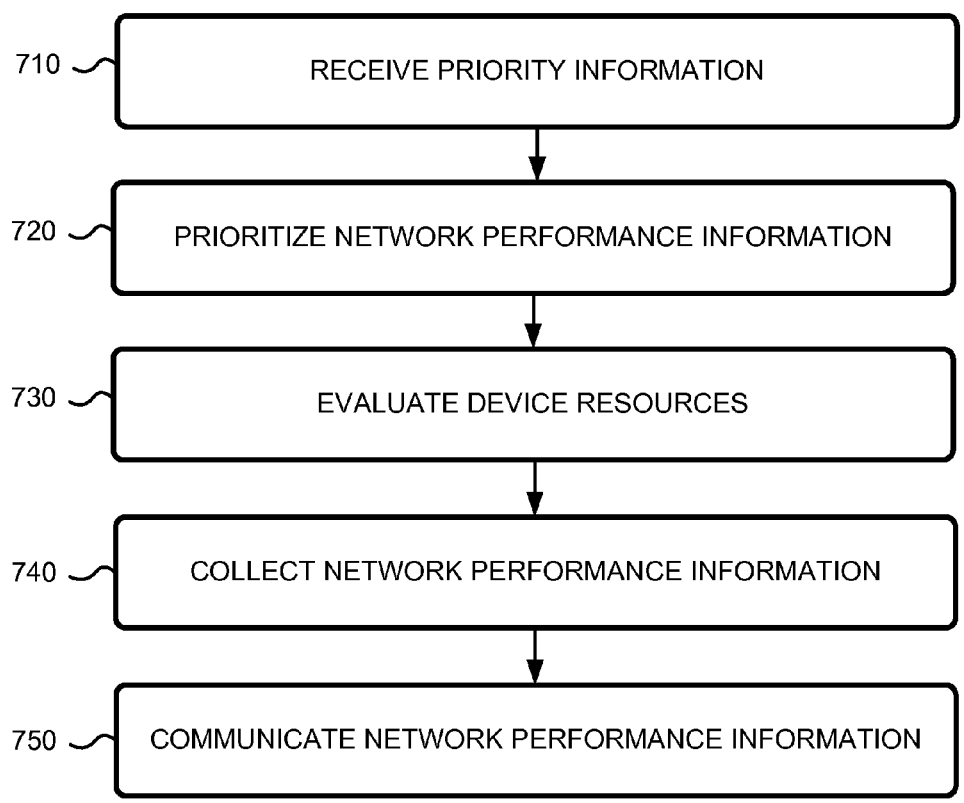
FIG. 7 is a diagram of an example process for providing network performance information according to one or more implementations described herein.

FIG. 7 is a diagram of an example process 700 for providing network performance information according to one or more implementations described herein. In one or more implementations, process 700 may be performed by one or more components of network device 500. In other implementations, some or all of process 700 may be performed by one or more other components/devices, or a group of components/devices, including or excluding network device 500.

Priority information may be received (block 710). For example, network device 500 may receive priority information from network management system 290. As mentioned above, the priority information may include instructions or other types of information relating to prioritizing one or more types of network performance information. In some implementations, the priority information may relate to a network condition detected by network management system 290.

Network performance information may be prioritized (block 720). For example, network device 500 may prioritize one or more types of network performance information. In some implementations, network device 500 may prioritize the types of network performance information based on the priority information received from network management system 290. As mentioned above, examples of network performance information types may include packet loss information corresponding to a particular network, throughput information corresponding to a particular network, latency information corresponding to a particular network, and/or one or more other types of information relating to the performance of a network or a network device.

Device resources may be evaluated (block 730). For instance, network device 500 may evaluate one or more device resources. Examples of device resources may include a processing capacity, a memory capacity, a bandwidth capacity, or one or more other types of capacities or capabilities corresponding to network device 500. As mentioned above, in some implementations, network device 500 may also, or alternatively, evaluate one or more device resources corresponding to another network device 500.

Network performance information may be collected (block 740). For instance, network device 500 may collect, calculate, or otherwise obtain network performance information. As mentioned above, network performance information may include various types of information, including information corresponding to a condition, a function, a process, and/or an operation associated with network device 500. Network performance information may correspond to information that may be readily collected by network device 500 (e.g., an identifier corresponding to network device 500, an identifier corresponding to a packet source, a time when a particular packet was received, etc.) or information that is calculated, measured, or otherwise derived by network device 500 (e.g., a processing rate, a change in available bandwidth over a particular period of time, a ratio corresponding to packet loss, a degree or severity corresponding to latency, etc.). Accordingly, network device 500 may collect a wide variety of network performance information.

In some implementations, network device 500 may collect network performance information based on the priorities assigned to one or more types of network performance information and/or the availability or cost associated with one or more device resources. For instance, network device 500 may collect the network performance information with the highest priority if sufficient device resources are available. However, if sufficient device resources are not available, network device 500 may collect the network performance information with the highest priority that the available device resources can collect. In other implementations, if sufficient device resources are not available, network device 500 may also, or alternatively, collect a smaller quantity of the highest-priority network performance information or collect an alternative form of the highest-priority network performance information (e.g., if the network performance information require calculations, network device 500 may instead collect the information used by the calculation and the calculation may later be performed by network management system 290). As such, network device 500 may collect network performance information in one or more of a variety of ways and/or forms.

In some implementations, network device 500 may implement one or more types of evaluation systems to help determine which network performance information will be collected and communicated to network management system 290. For example, network device 500 may assign a cost value to different types of device resources based on, for example, an anticipated demand for a device resource, a current usage amount corresponding to the device resource, a historical usage amount corresponding to the device resource, a capacity amount or capacity percentage that has been reserved for one or more other functions, or one or more other types of factors relating to device resources. Additionally, or alternatively, network device 500 may be assigned or allocated a quantity of information management points that network device 500 may use to help determine, for example, whether a particular set of device resources required to collect and transmit a particular amount of high-priority network performance information is too costly. As such, one or more implementations, described herein, may provide various solutions to identifying an optimal set of network performance information based on one or more priorities, conditions, constraints, or expectations.

Network performance information may be communicated (block 750). For example, network device 500 may communicate network performance information. In some implementations, network device 500 may communicate the network performance information to network management system 290.

While FIG. 7 shows a flowchart diagram of an example process 700 for providing network performance information, in other implementations, a process for providing network performance information may include fewer operations, different operations, differently arranged operations, or additional operations than depicted in FIG. 7.

Figure 8:
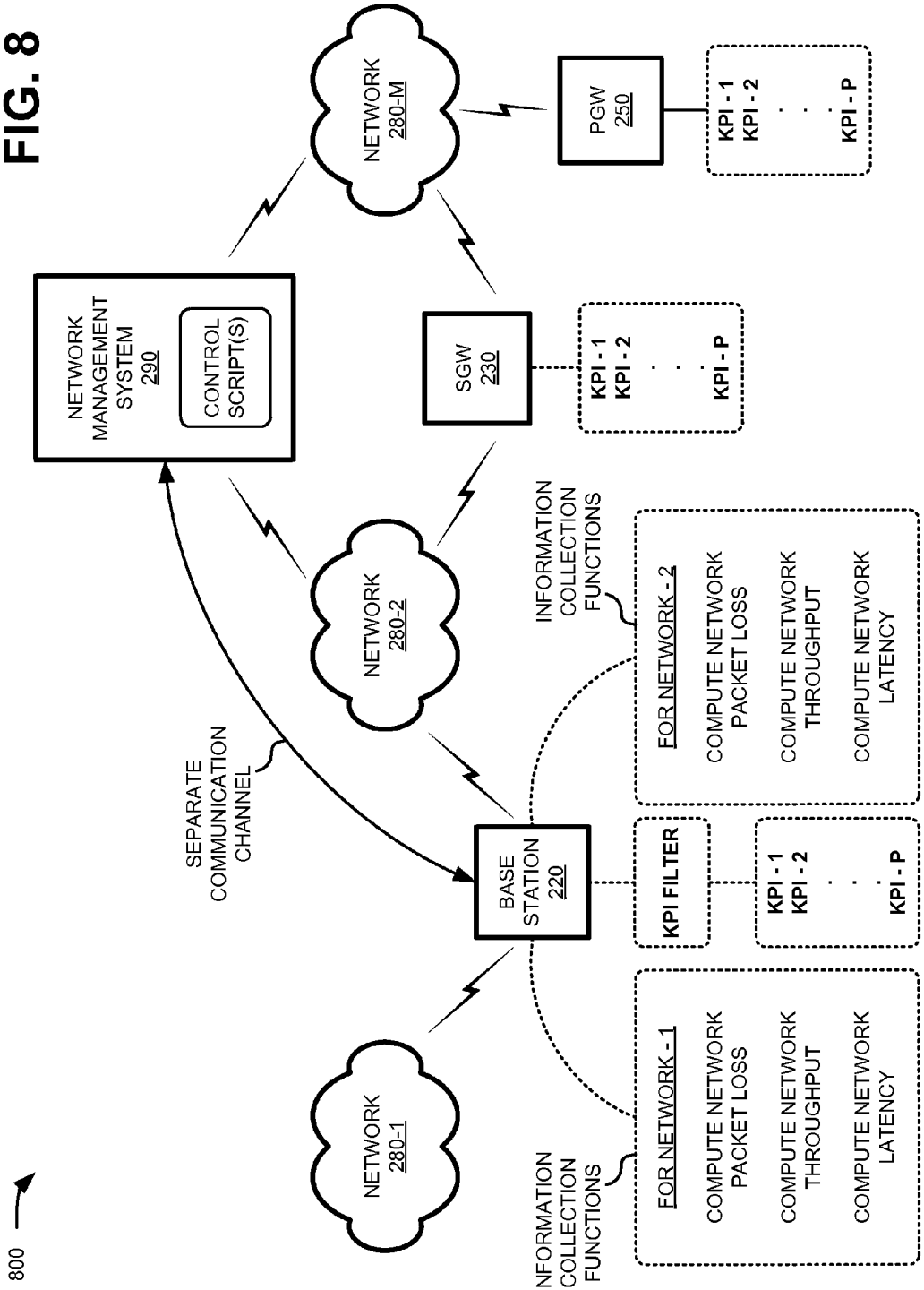
FIG. 8 is a diagram of a system for collecting network performance information according to one or more implementations described herein.

FIG. 8 is a diagram of an example system 800 for collecting network performance information according to one or more implementations described herein. As depicted, system 800 may include base station 220, SGW 230, PGW 250, network management system 290, and networks 810-1, 810-2, . . . , 810-M (where M≥1) (hereinafter referred to collectively as "networks 810," and individually as "network 810"). Base station 220, SGW 230, PGW 250, network management system 290, and network 280 are generally described above with reference to, for example, FIG. 2.

The number of devices and/or networks, illustrated in FIG. 8, is provided for explanatory purposes only. In practice, there may be additional devices and/or networks, fewer devices and/or networks, different devices and/or networks, or differently arranged devices and/or networks than illustrated in FIG. 8. Also, in some implementations, one or more of the devices of system 800 may perform one or more functions described as being performed by another one or more of the devices of system 800.

As described above, network management system 290 may detect a network condition, identify network performance information corresponding to the network condition, and/or communicate priority information, corresponding to the network performance information, to one or more network devices 500 (e.g., base station 220, SGW 230, and/or PGW 250). Each network device 500 may receive the priority information, evaluate device resources, collect network performance information based on the priority information and the device resources, and/or communicate the network performance information to network management system 290.

As depicted in the example of FIG. 8, in some implementations, network management system 290 may include one or more one or more control scripts or control modules for controlling one or more functions, processes, or operations of one or more network devices 500. For example, a control script of network management system 290 may be used to activate and/or deactivate one or more functions used by base station 220 to collect one or more types of network performance information. As depicted in FIG. 8, examples of such functions include one set of functions for collecting information regarding one network (e.g., network 280-1) and another set of functions for collecting information regarding another network (e.g., network 280-2). Additionally, or alternatively, each set of functions may include a function for computing a network packet loss, computing a network throughput, and computing a network latency. Accordingly, network management system 290 may communicate with base station 220 (or another type of network device 500) to activate or deactivate one or more of the information collection functions of base station 220.

In some implementations, network management system 290 may communicate with base station 220 (or another type of network device 500) via a separate, reserved, or dedicated communication channel. Providing a separate communication channel for communicating with network devices 500 may better enable network management system 290 to communicate requests, commands, and/or control information during times of high network congestion. In a similar manner, a separate communication channel may also, or alternatively, better enable network devices 500 to communicate network performance information to network management system 290.

As is also depicted in the example of FIG. 8, multiple network devices 500 (e.g., base station 220, SGW 230, and PGW 250) may collect one or more types of network performance information (e.g., key performance indicators (KPIs)). In the depicted example, base station 220, SGW 230, and PGW 250 are each configured to collect the same type of network performance information, represented by KPI-1, KPI-2, . . . , KPI-P (where P>1) (hereinafter referred to collectively as "KPIs," and individually as "KPI"). Configuring multiple network devices 500 to provide network management system 290 with the same types of network performance information may better enable network management system 290 to compare the performance of certain portions of system 800 with one or more other portions of system 800.

By contrast, in other implementations, one or more of base station 220, SGW 230, and/or PGW 250 may collect additional types of network performance information, different types of network performance information, and/or alternative types of network performance information. Additionally, or alternatively, while base station 220, SGW 230, and PGW 250 may be capable of collecting the same types of network performance information, the actual network performance information that is collected by base station 220, SGW 230, and PGW 250 may differ. For instance, the network performance information collected by base station 220 may correspond to network 280-1 and/or network 280-2, while the network performance information collected by SGW 230 may correspond to network 280-2 and/or 280-M, and the network performance information collected by PGW 250 may correspond to 280-M and/or another network (not shown in FIG. 8).

In some implementations, as depicted in FIG. 8, one or more network devices 500 (e.g., base station 220) may include a KPI filter to assist with preventing the collection and/or transmission of KPIs or other types of network performance information that may be insignificant, unnecessary, or otherwise undesirable. In some implementations, the KPI filter may be controlled and/or managed by network management system 290. As such, a KPI filter may provide network management system 290 with a direct solution to preventing the collection and/or transmission of certain types of network performance information. In other implementations, network management system 290 may also, or alternatively, control the collection of certain types of network performance information via priority information. For example, to prevent a particular network device 500 from collecting and/or transmitting a particular type of network performance information, network management system 290 may set, assign, or otherwise associate a very low priority to the unwanted type of network performance information.

In some implementations, a network device, such as base station 220 may evaluate the availability corresponding to one or more device resources by creating a list of one or more device resources and associating a cost value with each of the device resources. The cost value may correspond to a usage amount. The network device may also, or alternatively, determine whether adequate device resources are available to collect network performance information and to communicate the network performance information to the network management system. To do so, the network device may determine which of the device resources are required to collect the network performance information and to communicate the network performance information to the network management system. The network device may calculate a total cost value based on the cost value associated with each of the one or more device resources required to collect and communicate the network performance information and identify a quantity of information management points allocated to the network device for appropriating device resources to collect and communicate network performance information. The network device may determine whether the total cost value is less than the quantity of information management points allocated to the network device for appropriating device resources to collect and communicate network performance information.

As such, since system 800 provides multiple network devices 500 that are capable of collecting various types of network performance information corresponding to different portions of system 800, one or more implementations, described herein, may enable network management system 290 to evaluate system 800 in a more complete and/or detailed manner than might otherwise be possible. Furthermore, centralizing the prioritization of network performance information (e.g., via network management system 290), while distributing the responsibility of collecting the network performance information (e.g., via base station 220, SGW 230, and PGW 250) may provide an optimal balance between managing the identification of network performance information and distributing the resource requirements associated with collecting network performance information.

In light of the above, one or more of the implementations, described herein, may provide various solutions to optimizing the collection of network performance information. For instance, one or more implementations, described herein, may include network management system 290 that may detect network conditions, identify types of network performance information that are significant, and modify one or more network processes for collecting the network performance information. Additionally, or alternatively, one or more of the implementations, described herein, may provide a balanced solution to centralizing the management, analysis, and prioritization of network performance information yet distributing the responsibility of collecting the network performance information amongst multiple network devices 500. Furthermore, in some implementations, network devices 500 may operate intelligently by collecting high-priority network performance information without overextending device resources.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Further, certain implementations may involve a component that performs one or more functions. These components may include hardware, such as an ASIC or a FPGA, or a combination of hardware and software.

Even though particular combinations of features are recited in the claims and/or disclosed in the specification, these combinations are not intended to limit disclosure of the possible implementations. In fact, many of these features may be combined in ways not specifically recited in the claims and/or disclosed in the specification. Although each dependent claim listed below may directly depend on only one other claim, the disclosure of the implementations includes each dependent claim in combination with every other claim in the claim set.

No element, act, or instruction used in the present application should be construed as critical or essential to the implementations unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A computing device, comprising:
 a memory to store instructions; and
 a processor to execute the instructions to:
  receive, from a network management system, priority information assigning priority values, to one or more types of network performance information, corresponding to a degree of relevance regarding a network condition, prioritize, based on the priority information, one or more types of network performance information, evaluate an availability corresponding to one or more device resources associated with the computing device, identify one or more collection functions related to collecting network performance information corresponding to the network condition, receive, from the network management system, a request to activate the identified collection functions, collect the network performance information based on the prioritizing of the one or more types of network performance information and the availability corresponding to the one or more device resources, and communicate the collected network performance information to the network management system.

2. The computing device of claim 1, wherein the collected network performance information comprises:

performance information corresponding to a particular network device, performance information corresponding to a particular network device function, a packet loss ratio, a throughput ratio, network latency information, a quantity of create session requests, a quantity of delete bearer session requests, a quantity of modify bearer quality of service requests, a quantity of device interface octets, processor usage statistics, or a quantity of dropped calls over a particular interval of time.

3. The computing device of claim 1, wherein, to collect the network performance information, the processor is to execute the instructions to:

identify, from the one or more types of network performance information, a type of network performance information associated with a highest priority, determine an amount of device resources required to collect network performance information corresponding to the type of network performance information associated with the highest priority and to communicate the network performance information to the network management system, determine whether adequate device resources are available based on the required amount of device resources and based on the availability corresponding to the one or more device resources, when adequate device resources are available,
collect the network performance information, and
communicate the network performance information to the network management system, and when adequate device resources are not available,
identify other network performance information to collect,
collect the other network performance information, and
communicate the other network performance information to the network management system.

4. The computing device of claim 1, wherein, to evaluate the availability corresponding to one or more device resources, the processor is to execute the instructions to:

measure a current usage amount corresponding to the one or more device resources, identify an amount of unreserved capacity corresponding to the one or more device resources, or determine an expected usage amount, corresponding to the one or more device resources, based on historical usage amounts corresponding to the one or more device resources.

5. The computing device of claim 3, wherein, to evaluate the availability corresponding to one or more device resources, the processor is to execute the instructions to:

create a list comprising the one or more device resources, associate a cost value with each of the one or more device resources, wherein the cost value corresponds to a usage amount, and to determine whether adequate device resources are available to collect the network performance information and to communicate the network performance information to the network management system, the processor is to execute the instructions to:

determine which of the one or more device resources are required to collect the network performance information and to communicate the network performance information to the network management system, calculate a total cost value based on the cost value associated with each of the one or more device resources required to collect and communicate the network performance information, identify a quantity of information management points allocated to the computing device for appropriating device resources to collect and communicate network performance information, and determine whether the total cost value is less than the quantity of information management points allocated to the computing device for appropriating device resources to collect and communicate network performance information.

6. The computing device of claim 1, wherein the processor further executes the instructions to:

receive, from the network management system, a control script in the request to activate the identified collection functions.

7. The computing device of claim 1, wherein the processor further executes the instructions to:

identify one or more other collection functions unrelated to collecting the network performance information corresponding to the network condition, and receive, from the network management system, a request to deactivate the identified other collection functions.

8. One or more non-transitory computer-readable storage media, comprising one or more instructions that, when executed by a processor, cause the processor to:

receive, from a network management system, priority information assigning priority values, to one or more types of network performance information, corresponding to a degree of relevance regarding a network condition;

prioritize, based on the priority information, one or more types of network performance information;

identify one or more device resources;

assign a cost value to each of the one or more device resources, wherein the cost value corresponds to a demand to use a particular device resource for one or more operations other than collecting network performance information;

identify a quantity of information management points allocated for appropriating device resources to collect network information;

identify a set of network performance information to collect based on the cost value assigned to each of the one or more device resources and priorities associated with the one or more types on network performance information; and collect the set of network performance information and communicate an optimal set of network performance information to the network management system.

9. The computer-readable storage media of claim 8, further comprising one or more instructions that cause the processor to:

compare priority levels corresponding to different types of network performance information of the prioritized types of network performance information in order to identify the optimal set of network performance information.

10. The computer-readable storage media of claim 8, wherein the optimal set of network performance information comprises:

network performance information corresponding to a type of network performance information associated with a highest priority level, and network performance information corresponding to a different type of network performance data than the type of network performance data associated with the highest priority level.

11. The computer-readable storage media of claim 8, further comprising one or more instructions that cause the processor to:

identify one or more collection functions for collecting the network performance information corresponding to the network condition, and receive, from the network management system, a request to activate the identified collections functions for collecting the identified network performance information.

12. The computer-readable storage media of claim 8, further comprising one or more instructions that cause the processor to:

identify one or more collection functions unrelated to collecting the network performance information corresponding to the network condition, and receive, from the network management system, a request to deactivate the identified collections functions.

13. A computer device-implemented method, comprising:

receiving, from a network management system, priority information assigning priority values, to one or more types of network performance information, corresponding to a degree of relevance regarding a network condition, prioritizing, based on the priority information, one or more types of network performance information, evaluating an availability corresponding to one or more device resources associated with the computer device, identifying one or more collection functions related to collecting network performance information corresponding to the network condition, receive, from the network management system, a request to activate the identified collection functions, collecting the network performance information based on the prioritizing of the one or more types of network performance information and the availability corresponding to the one or more device resources, and communicating the collected network performance information to the network management system.

14. The computer device-implemented method of claim 13, wherein the collected network performance information comprises:

performance information corresponding to a particular network device, performance information corresponding to a particular network device function, a packet loss ratio, a throughput ratio, or network latency information.

15. The computer device-implemented method of claim 13, wherein the collected network performance information comprises:

a quantity of create session requests, a quantity of delete bearer session requests, a quantity of modify bearer quality of service requests, a quantity of device interface octets, processor usage statistics, or a quantity of dropped calls over a particular interval of time.

16. The computer device-implemented method of claim 13, wherein collecting the network performance information comprises:

identifying, from the one or more types of network performance information, a type of network performance information associated with a highest priority, determining an amount of device resources required to collect network performance information corresponding to the type of network performance information associated with the highest priority and to communicate the network performance information to the network management system, determining whether adequate device resources are available based on the required amount of device resources and based on the availability corresponding to the one or more device resources, when adequate device resources are available,
collecting the network performance information, and
communicating the network performance information to the network management system, and when adequate device resources are not available,
identifying other network performance information to collect,
collecting the other network performance information, and
communicating the other network performance information to the network management system.

17. The computer device-implemented method of claim 13, wherein evaluating the availability corresponding to one or more device resources comprises:

measuring a current usage amount corresponding to the one or more device resources, identifying an amount of unreserved capacity corresponding to the one or more device resources, or determining an expected usage amount, corresponding to the one or more device resources, based on historical usage amounts corresponding to the one or more device resources.

18. The computer device-implemented method of claim 16, wherein, evaluating the availability corresponding to one or more device resources comprises:

creating a list comprising the one or more device resources, associating a cost value with each of the one or more device resources, wherein the cost value corresponds to a usage amount, and determining whether adequate device resources are available to collect the network performance information and communicating the network performance information to the network management system comprises:

determining which of the one or more device resources are required to collect the network performance information and to communicate the network performance information to the network management system, calculating a total cost value based on the cost value associated with each of the one or more device resources required to collect and communicate the network performance information, identifying a quantity of information management points allocated to the computer device for appropriating device resources to collect and communicate network performance information, and determining whether the total cost value is less than the quantity of information management points allocated to the computer device for appropriating device resources to collect and communicate network performance information.

19. The computer device-implemented method of claim 13, further comprising:

receiving, from the network management system, a control script in the request to activate the identified collection functions.

20. The computer device-implemented method of claim 13, further comprising:

identifying one or more other collection functions unrelated to collecting the network performance information corresponding to the network condition, and receiving, from the network management system, a request to deactivate the identified other collection functions.

* * * * *